United States Patent
Lewis

(10) Patent No.: US 6,408,769 B1
(45) Date of Patent: Jun. 25, 2002

(54) STEERING WHEEL TABLE

(76) Inventor: Jane D. Lewis, 1460 Golden Gate Pkwy., PMB 519, Suite 103, Naples, FL (US) 34105

(*) Notice: Subject to any disclaimer, the term of this patent is extended or adjusted under 35 U.S.C. 154(b) by 0 days.

(21) Appl. No.: 09/775,985

(22) Filed: Feb. 5, 2001

(51) Int. Cl.[7] ............................................... A47B 37/00
(52) U.S. Cl. ............................................. 108/44; 108/9
(58) Field of Search .................... 108/44, 9, 45, 108/42

(56) References Cited

U.S. PATENT DOCUMENTS 4,890,559 A  * 1/1990  Martin ..................... 108/44
5,386,785 A  * 2/1995  Naor ....................... 108/44

FOREIGN PATENT DOCUMENTS

DE            2025003    * 12/1971  ............. 108/44

* cited by examiner

Primary Examiner—Peter M. Cuomo
Assistant Examiner—Jerry A. Anderson
(74) Attorney, Agent, or Firm—Merrill N. Jonnson

(57) ABSTRACT

A steering-wheel table has a tabletop (1) with a top seat (3) on a bottom forward portion of the tabletop and two bottom seat members (5) that pivot down from proximate a rearward portion of the tabletop to rest on low portions of a steering wheel (2). For tilt-adjustable steering wheels, the two bottom seats can have fixed distances from the tabletop. For non-tilt steering wheels, the two bottom seats can be at variable distances from the tabletop. The top seat can be a catch bracket in a catch pocket in a bottom of the tabletop and the two bottom seats can be on a support leg (4) that folds into a storage pocket (8) in a bottom of the tabletop.

2 Claims, 4 Drawing Sheets

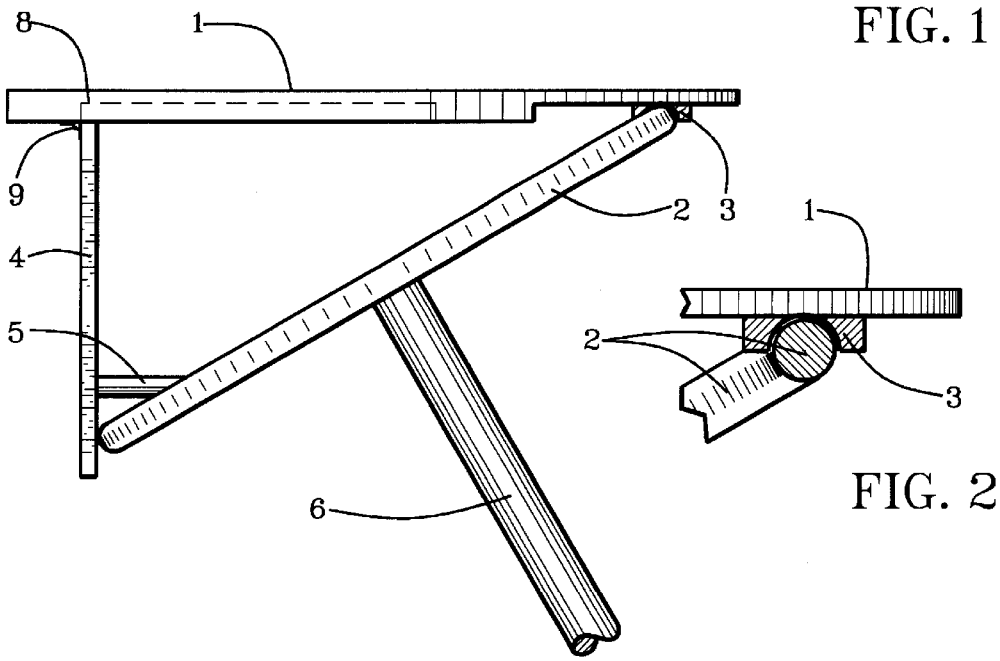
FIG. 1
FIG. 2
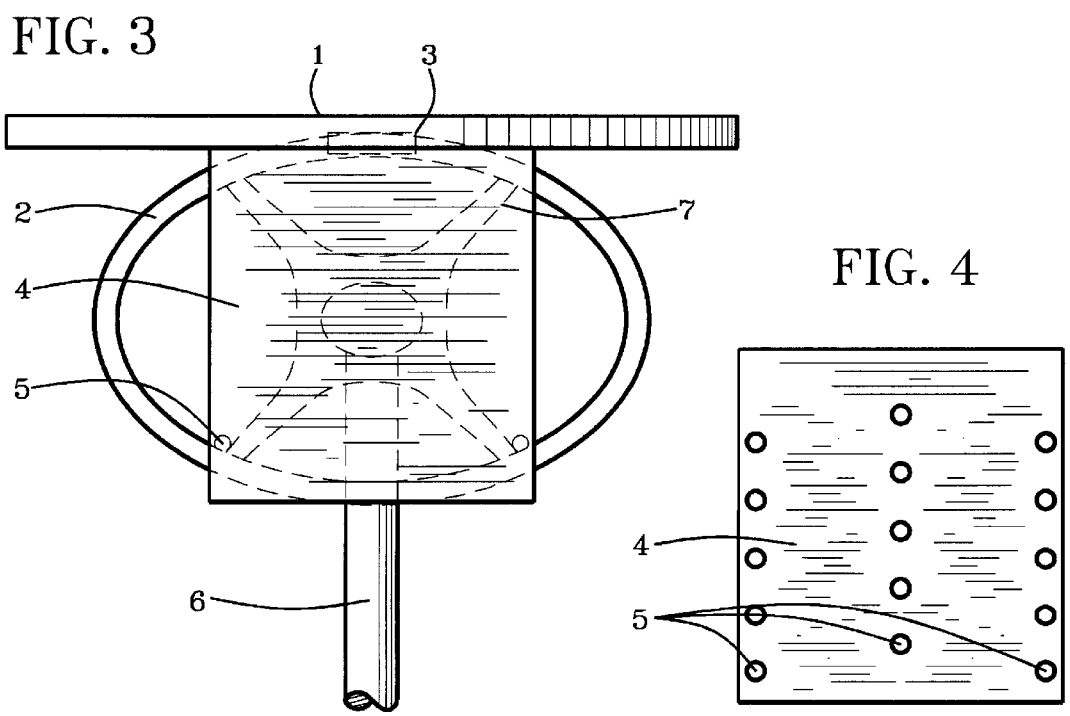
FIG. 3
FIG. 4

STEERING WHEEL TABLE

FIELD OF THE INVENTION

1. Field of the Invention

This invention relates to tables for steering wheels of cars, motor homes, campers trucks and other motor vehicles.

BACKGROUND OF THE INVENTION

2. Relation to Prior Art

Steering-wheels tables for motor vehicles are known, but not with a convenient and reliable three-point attachment in a manner taught by this invention.

Examples of most-closely related known but different devices are described in the following patent documents:

| Number | Date | Inventor | Classification |
| --- | --- | --- | --- |
| 6,038,983 | 3/00 | Lendl | 108/44 |
| 2,866,381 | 12/58 | Alldredge | 88/29 |
| 2,746,821 | 5/56 | Schroeder | 311/21 |

In the above patents, inventor Lendl described a table arrangement for motor vehicles having a hinged case structure with a case bottom that laid on a steering wheel to which it was hooked and a case top being a table top that pivoted upwardly from the bottom on hinges at a top of the steering wheel and was supported in a horizontal orientation with a movable strut between the case bottom and the case top. Inventor Alldredge described a map-reading apparatus that was supported on a steering wheel by two top hooks and a single bottom hook that has a plurality of C-clamp adjustments. Inventor Schroeder described an automobile service table having two C-clamps spaced apart on an edge of a flat tray upwardly from a third C-clamp on a pivotal support extended pivotally from an opposite side of the flat tray to a bottom portion of the steering wheel. Neither of these devices describe a three-point attachment of a table to a steering wheel in a manner taught by this invention.

SUMMARY OF THE INVENTION

Objects of patentable novelty and utility taught by this invention are to provide a steering-wheel table which:

has sturdy three-point attachment at a top and two separate lower portions of a steering wheel;

can be quickly and easily set up and removed;

is convenient to store and to handle; and is inexpensive.

This invention accomplishes these and other objectives with a steering-wheel table having a top seat on a bottom forward portion of the table and two bottom seats that pivot down from proximate a rearward portion of the table to rest on low portions of the steering wheel. For adjustable steering wheels, the two bottom seats can have fixed distances from the table. For non-adjustable steering wheels, the two front seats can be at variable distances from the table. The top seat can be a catch bracket in a catch pocket in a bottom of the table and the two bottom seats can be on a support leg that folds into a support-leg pocket in a bottom of the table.

BRIEF DESCRIPTION OF DRAWINGS

This invention is described by appended claims in relation to description of a preferred embodiment with reference to the following drawings which are explained briefly as follows:

FIG. 1 is a side view of a steering-wheel table having a support leg with a fixed length;

FIG. 2 is a partially cutaway side view of a top portion of a steering wheel in a top seat on a bottom-forward portion of a tabletop;

FIG. 3 is a front view of the FIG. 1 illustration;

FIG. 4 is a rear view of the support leg having a fixed length;

DESCRIPTION OF PREFERRED EMBODIMENT

Figure 5:
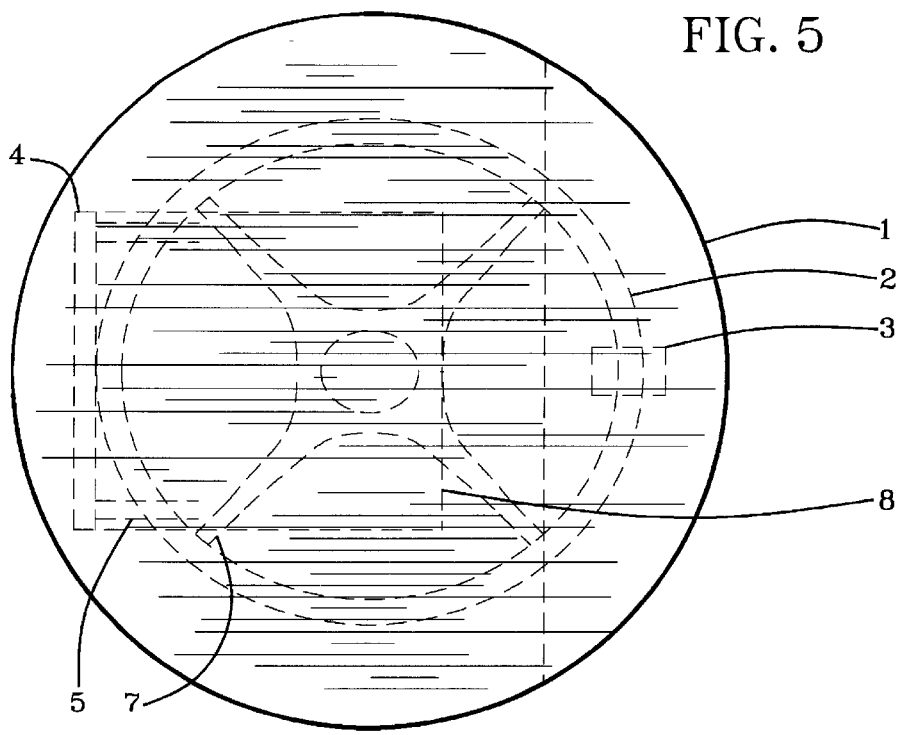
FIG. 5 is a top view of the FIG. 1 illustration.

Listed numerically below with reference to the drawings are terms used to describe features of this invention. These terms and numbers assigned to them designate the same features throughout this description.

1. Tabletop
2. Steering wheel
3. Top seat
4. Support leg
5. Bottom seat members
6. Steering column
7. Steering-wheel spokes
8. Storage pocket
9. Support-leg hinge
10. Adjustable support leg
11. Set knob
12. Adjustment-leg hinge
13. Brace
14. First adjustable bottom seat
15. Second adjustable bottom seat
16. Table extension
17. Rectangular tabletop
18. Extension fastener
19. Telescopic extension leg
20. Ball-and-socket support
21. Dashboard member
22. Floorboard
23. Vehicle seat
24. Support base
25. Axle
26. Tightening lever
27. Support cable
28. Balls
29. Rod sockets
30. Support tip Referring first to FIGS. 1–5, a tabletop 1 is sized to fit predeterminedly over a steering wheel 2 of a motor vehicle. On a bottom-forward portion of the tabletop 1, a top seat 3 fits onto a top-forward portion of the steering wheel 2. On at least one support leg 4 extended predeterminedly downward from proximate bottom-rearward portions of the tabletop 1, two or more bottom seat members 5 fit onto bottom-rearward portions of the steering wheel 2.

For steering columns 6 of steering wheels 2 that are adjustable for steering-wheel tilt, the support leg 4 can but need not have a fixed length with a fixed distance intermediate a bottom of the tabletop 1 and positions of rest of the bottom seat members 5 on the steering wheel 2. Permanent or adjustable positioning of the bottom seat members 5 on the support leg 4 is shown in FIG. 4.

A physical principle employed in attachment of this tabletop 1 to the steering wheel 2 includes a modified three-point connection. A first point of connection is the top seat 3 with which the tabletop 1 is prevented from forward or rearward travel by placing 5 a top-forward portion of steering wheel 2 in a bay or other container for a portion of the steering wheel 2 as shown in FIGS. 1–2. Two of the bottom seat members 5 are prevented from traveling downwardly or laterally by the steering wheel 2 as shown further in FIGS. 1 and 3. Steering-wheel spokes 7 can be employed to aid prevention of downward and lateral travel of the bottom seat members 5 that are positioned appropriately on the support leg 4, but are not required.

Preferably, a storage pocket 8 for at least the support leg 4 is provided in the tabletop 1 for receiving the support leg 4 when pivoted upward on a support-leg hinge 9.

Figure 6:
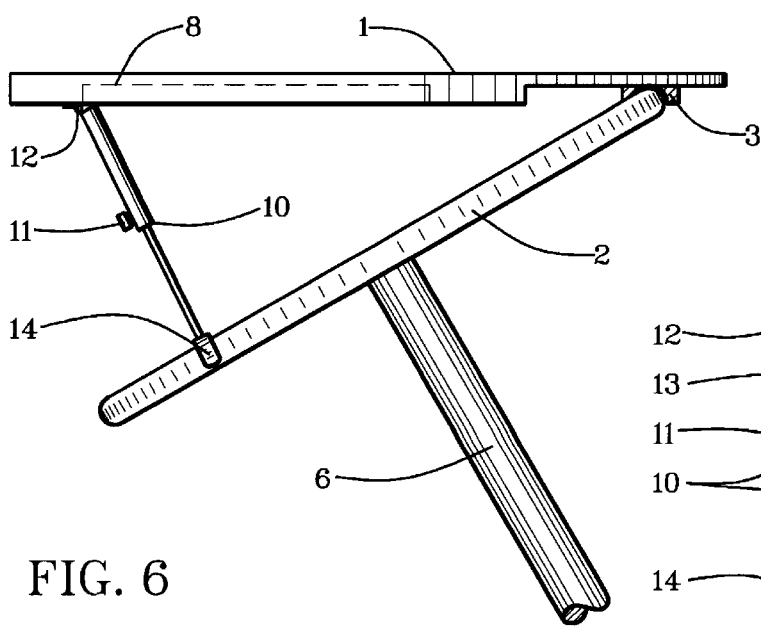
FIG. 6 is a side view of a steering-wheel table having a support leg with a telescopic variable length.
Figure 7:
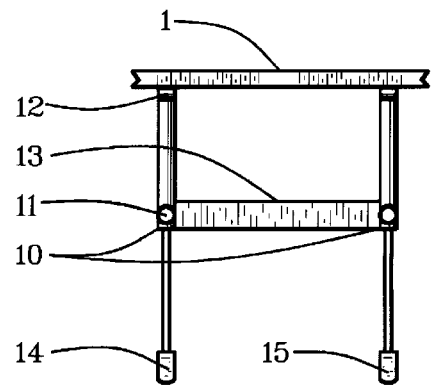
FIG. 7 is a rear view of a pair of the support legs having variable length.

Referring to FIGS. 5–7, optionally in particular for use on non-adjustable steering wheels 2 without tilt adjustment, but useable for either tilt or non-tilt steering wheels 2, an adjustable support leg 10 has an adjustable length for an adjustable-height distance of the rearward portions of the tabletop 1 from the bottom-rearward portions of the steering wheel 2. The adjustable support leg 10 shown as preferred is telescopic with a set knob 11 for set-screw fastening. The adjustable support legs 10 are pivotal vertically on adjustment-leg hinges 12 and can be joined by brace 13 for structural integrity and reliability of limitation to verticality of hinge pivot.

The adjustable support legs 10 are pivotal upwardly to an appropriate storage pocket 8 for storage mode and are pivotal downwardly for an installation mode in which a first adjustable bottom seat 14 on the adjustable support leg 10 fits onto a first side of the bottom rearward portions of the steering wheel 2 and a second adjustable bottom seat 15 on the adjustable support leg 10 fits onto a second side of the bottom rearward portions of the steering wheel 2. The first adjustable bottom seat 14 and the second adjustable bottom seat 15 are preferably U-hooks or C-hooks. The adjustable support leg 10 can be referred to plurally or singularly when joined by the brace 13 or when operated jointly with the adjustment-leg hinges 12.

Figure 8:
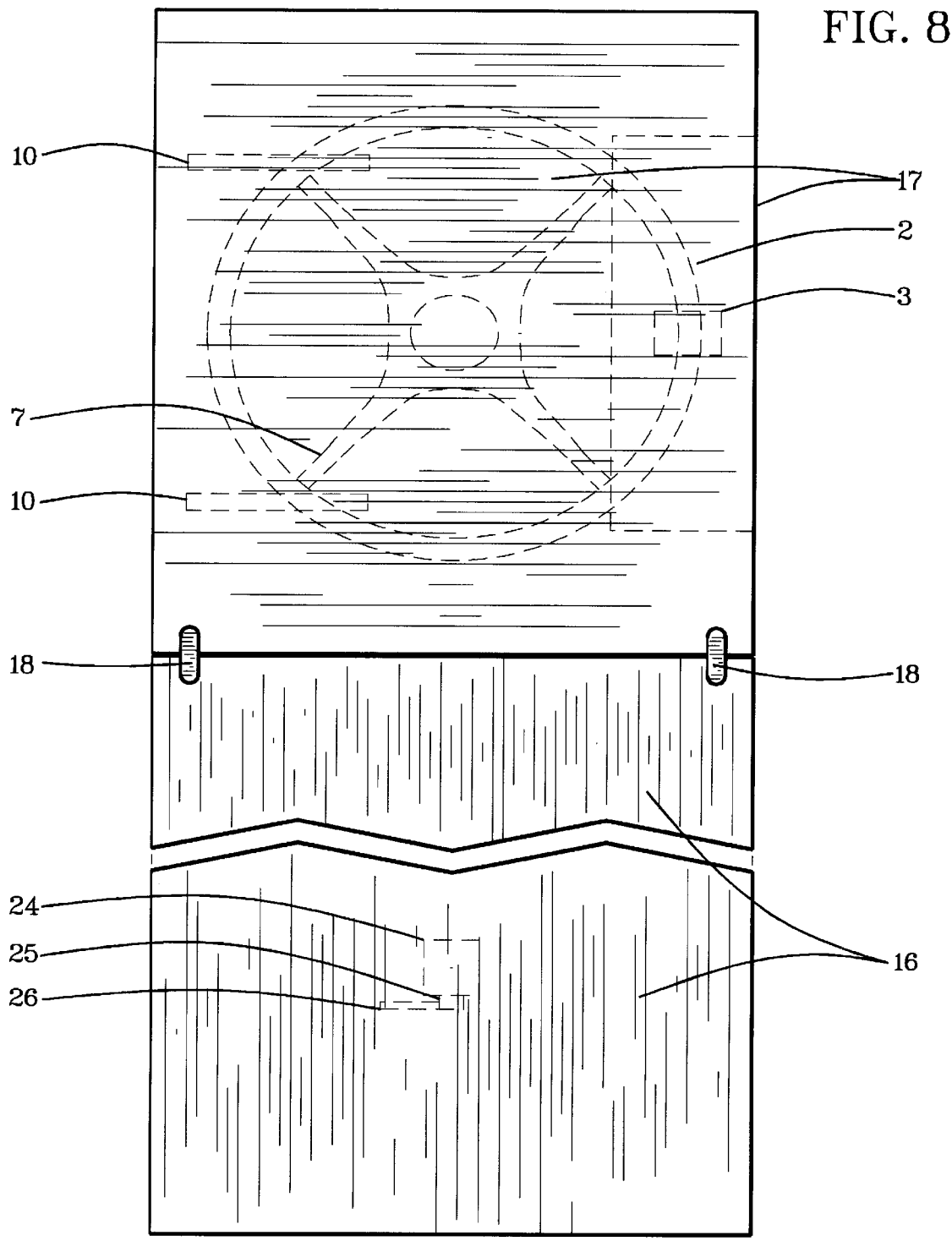
FIG. 8 is a top view of a rectangular tabletop having a table extension into a passenger side of a motor vehicle.
Figure 9:
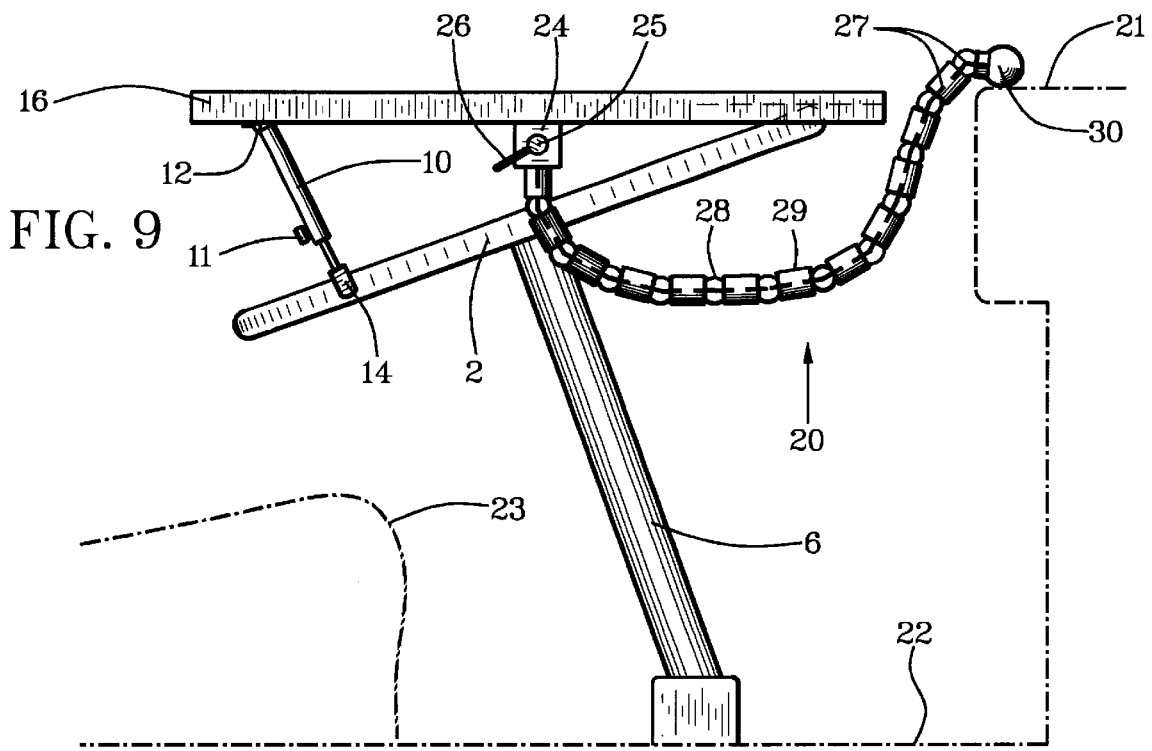
FIG. 9 is a side view of the table extension having a universal support as a fixable-length extension leg resting on a dashboard portion of the motor vehicle.
Figure 10:
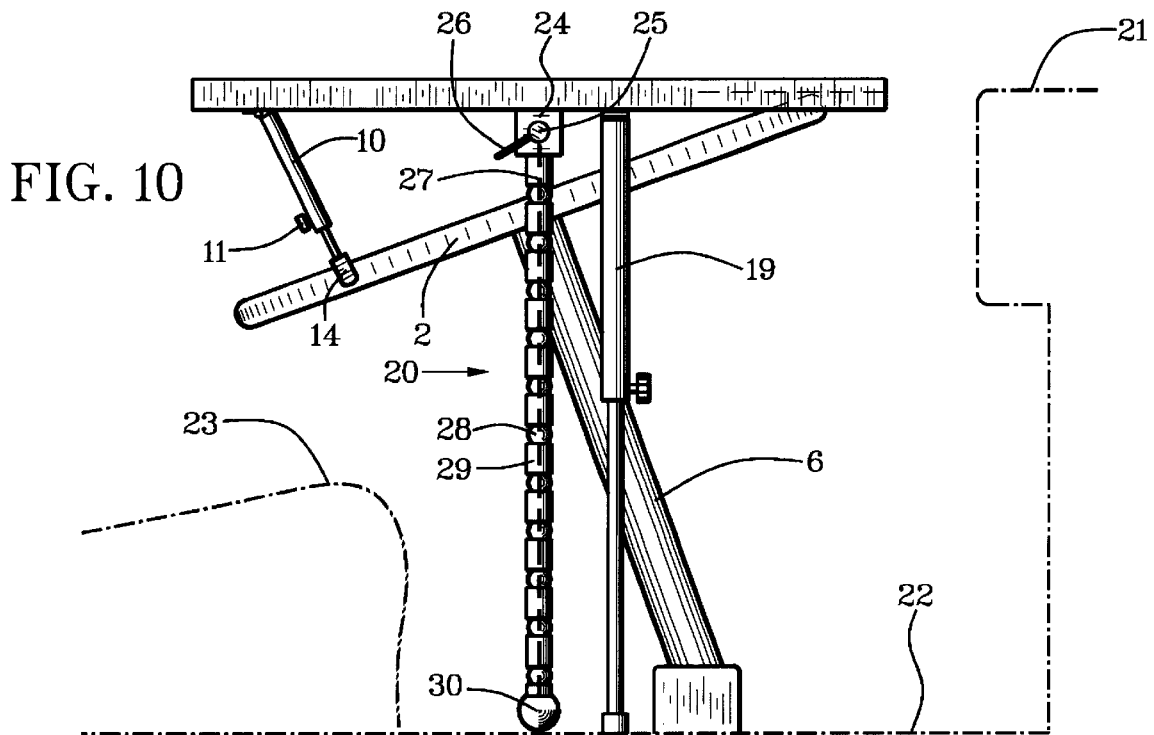
FIG. 10 is a side view of the table extension having a universal support as the fixable-length extension leg in addition to a telescopic extension leg resting on a floorboard of the motor vehicle.

The tabletop 1 can be round or rounded as shown in FIGS. 1–3, and 5–6 for singular use. Optionally, for either singular use or for use with a table extension 16, a rectangular tabletop 17 shown in FIG. 8 can be employed.

Referring to FIGS. 6–10, the table extension 16 can have a driver edge attached to the rectangular tabletop 17 with extension fasteners 18 and can be supported vertically in a direction of a passenger edge with preferably an adjustable-length extension leg that include a telescopic extension leg 19 and/or a ball-and-socket support 20. The ball-and-socket support 20 can provide support from either a dashboard member 21 or from a floorboard 22 as appropriate for particular positioning and structure of a vehicle seat 23. Attached to a bottom of the table extension 16, the ball-and-socket support 20 can include a support base 24 with an axle 25 and tightening lever 26 for tightening a support cable 27 that is centrally inside of a sequential series of balls 28 and rod sockets 29 intermediate a support tip 30 and the support base 24.

The ball-and-socket support 20 can be made of mostly plastic for low weight and low cost. Also, it can be sufficiently long to allow height adjustment with relatively crooked for short or relatively straight for long tightening in place.

A new and useful steering-wheel table having been described, all such foreseeable modifications, adaptations, substitutions of equivalents, mathematical possibilities of combinations of parts, pluralities of parts, applications and forms thereof as described by the following claims and not precluded by prior art are included in this invention.

What is claimed is:

1. In a steering-wheel table comprising a tabletop sized to fit over a steering wheel of a motor vehicle; a top set on a bottom-forward portion of the tabletop; the top seat fitting onto a top-forward portion of the steering wheel; two or more bottom seats on at least one support leg extended downward from proximate bottom-rearward portions of the steering wheel; the at least one support leg has a fixed length for a fixing distance of the rearward portions of the steering wheel; the at least one support leg includes a single leg that is attached pivotally to an aft wall of a storage pocket into which the support leg is pivotal in the bottom-rearward portions of the tabletop in a storage mode; the support leg is pivotal downwardly from the aft wall for an installation mode; a first bottom seat on the support leg fits onto a first side of the bottom rearward portions of the steering wheel in the installation mode; and a second bottom seat on the support leg fits onto a second side of the bottom rearward portions of the steering wheel in the installation mode; the tabletop is round with a diametric length proximate a diametric length of an intended steering wheel; and an extension leg extended downward pivotally from a bottom of the table extension; the extension leg is pivotal and lockable in length and direction of extension; the extension leg is a ball-and-socket support having a lever-rod base on a bottom of the table extension and a support tip on a tip end.

2. In a steering-wheel table comprising a tabletop sized to fit over a steering wheel of a motor vehicle; a top set on a bottom-forward portion of the tabletop; the top seat fitting onto a top-forward portion of the steering wheel; two or more bottom seats on at least one support leg extended downward from proximate bottom-rearward portions of the steering wheel; the at least one support leg has a fixed length for a fixing distance of the rearward portions of the steering wheel; the at least one support leg includes a single leg that is attached pivotally to and aft wall of a storage pocket into which the support leg is pivotal in the bottom-rearward portions of the tabletop in a storage mode; the support leg is pivotal downwardly from the aft wall for an installation mode; a first bottom seat on the support leg fits onto a first side of the bottom rearward portions of the steering wheel in the installation mode; and a second bottom seat on the support leg fits onto a second side of the bottom rearward portions of the steering wheel in the Installation mode; the tabletop is round with a diametric length proximate a diametric length of an intended steering wheel; and an extension leg extended downward pivotally from a bottom of the table extension; the extension leg is pivotal and lockable in length and direction of extension; the fixable-length extension leg is a ball and socket support having a lever-rod base on a bottom of the table extension and the support tip on the tip end.

* * * * *